United States Patent
Yang et al.

(10) Patent No.: US 8,531,143 B2
(45) Date of Patent: Sep. 10, 2013

(54) PERMANENT MAGNET MOTOR WITH STATOR-BASED SALIENCY FOR POSITION SENSORLESS DRIVE

(75) Inventors: Shih-Chin Yang, Madison, WI (US); Takhiro Suzuki, Ibaraki (JP); Robert Donald Lorenz, Madison, WI (US); Thomas Merlin Jahns, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 451 days.

(21) Appl. No.: 12/879,350

(22) Filed: Sep. 10, 2010

(65) Prior Publication Data
US 2012/0062160 A1 Mar. 15, 2012

(51) Int. Cl.
*H02P 6/00* (2006.01)
(52) U.S. Cl.
USPC ............ 318/400.32; 318/400.02; 318/400.14; 318/40.33; 318/400.34; 318/721
(58) Field of Classification Search
USPC ............... 318/400.32, 400.33, 560, 400.14, 318/400.01, 400.02, 400.34, 701, 718, 721, 318/727, 799, 801, 809, 823, 512; 310/49.28, 310/153; 73/862.331; 336/30, 110; 388/821, 388/841, 928.1, 807
See application file for complete search history.

(56) References Cited

U.S. PATENT DOCUMENTS

| | | | | |
|---|---|---|---|---|
| 7,015,664 | B2 * | 3/2006 | Coles et al. | 318/400.01 |
| 7,808,203 | B2 * | 10/2010 | Tomigashi | 318/808 |
| 8,217,605 | B2 * | 7/2012 | Balazovic et al. | 318/400.33 |
| 8,228,013 | B2 * | 7/2012 | Liu et al. | 318/400.33 |

FOREIGN PATENT DOCUMENTS

| | | |
|---|---|---|
| EP | 2061147 | 5/2009 |
| WO | 2004023639 | 3/2004 |
| WO | 2009024835 | 2/2009 |
| WO | WO 2009024835 A1 * | 2/2009 |

OTHER PUBLICATIONS

Ha, Jung-Ik, et al., Design and Selection of AC Machine for Saliency-Based Sensorless Control, pp. 1155-1162, vol. 2, Conference Record of the Industry Applications Conference, 2002. 37th IAS Annual Meeting., IEEE, New York, New York, USA.

Jang, Jo-Hoon, et al., Sensorless Drive of Surface-Mounted Permanent-Magnet Motor by High-Frequency Signal Injection Based on Magnetic Saliency, pp. 1031-1039,vol. 39, Issue 4, Transactions of Industry Applications, Jul.-Aug. 2003, IEEE, New York, New York, USA.

(Continued)

*Primary Examiner* — Antony M Paul
(74) *Attorney, Agent, or Firm* — Boyle Fredrickson S.C.

(57) ABSTRACT

A permanent magnet motor for position sensorless drive operation provides a stator design that exhibits a saliency (machine asymmetric) functionally dependent on rotor position as caused by periodic magnetic saturation of stator structure. This saturation property is caused by rotor zigzag leakage flux from surface permanent magnets. The stator structure may be designed to further saturate from zigzag leakage flux to provide greatest spatial saliency in the quadrature phase for motor position sensorless position estimation. The position, velocity, and shaft torque can be extracted by measuring the phase current from the stator coil of permanent magnet motor.

14 Claims, 3 Drawing Sheets

(56) References Cited

OTHER PUBLICATIONS

Akatsu, Kan, et al., SPMSM Design Considerations for Initial Position and Magnet Polarity Estimation Using Carrier Signal Injection, pp. 2393,2398, Conference Record of the Industry Applications Conference, 2007. 42$^{nd}$ IAS Annual Meeting., IEEE, New York, New York, USA.

Ji-Noon Jang et al: Sensorless Drive of Surface-Mounted Permanent-Magnet Motor by High-Frequency Signal Injection Based on Magnetic Saliency; IEEE Transaction on Industry Applications, IEEE Service Center, Piscataway, NJ, US.; vol. 39, No. 4, Jul. 1, 2003, pp. 1031-1039 XP011098895,ISSN: 0093-9994, DOI: 10.1109/TIA.2003.813734 abstract.

* cited by examiner

PERMANENT MAGNET MOTOR WITH STATOR-BASED SALIENCY FOR POSITION SENSORLESS DRIVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to position sensorless permanent magnet motor drives and in particular to a method of sensing rotor position in such motors using stator-based saliency (sometimes referred to as motor asymmetry).

Permanent magnet synchronous motors provide a torque through the interaction of a magnetic field generated by one or more electrical coils and one or more permanent magnet elements. The magnetic field generated by the current supplied to the coils must be synchronized with the position of the magnetic field of the permanent magnets and consequently such motors are normally termed "synchronous motors".

Permanent magnet synchronous motors place the permanent magnets on the rotor to provide multiple, angularly spaced magnetic poles (eliminating the need for brushes to carry power to the rotating rotor) and sense rotor position to properly synchronize the drive current to coils in the stator.

In a "surface permanent magnet synchronous motor" (SPMSM), the permanent magnets of the rotor are on the surface of the rotor. In an "interior permanent magnet synchronous motor" (IPMSM), the permanent magnets are embedded in a metallic core of the rotor.

The sensing of rotor position, in order to properly coordinate the drive signals to the coils of the stator, may be accomplished by a variety of means. For example, one or more Hall effect sensors may be placed on the stator to sense changes in the magnetic field generated by the rotor as it spins. Alternatively, position resolution may be obtained by mounting an encoder or a resolver to the rotor shaft. Absolute rotor position is not necessary but only relative position of the motor poles with respect to the stator coils.

Discrete rotor position sensors may substantially decrease the reliability of the motor by introducing additional electrical conductors and connectors that are substantially less robust than the motor windings and their terminations. Accordingly there is considerable interest in producing "position sensorless" motor drives, for example, by analyzing slight perturbations in the drive currents caused by motor saliency. Saliency, as used herein, refers to periodic fluctuations in the electrical properties of the motor as a function of the position of the rotor. These saliency-based sensorless control implementations are described in U.S. Patent Publication Nos. US 1996/5565752, US 2000/6069467, US 2006/7045988 B2 and US 2006/7098623 B2 all hereby incorporated by reference.

One type of motor saliency that may be exploited for this purpose is the change in reluctance between stator coils caused by the permanent magnet inclusions in the rotor in an IPMSM design. As the rotor moves and the permanent magnet inclusions move into and out of an inter-coil path, this change in reluctance may be detected by a carrier current superimposed on the drive signal of the stator. IPMSM sensorless drive is reported in "Ogasawara et al., Implementation and position control performance of a position sensorless IPM motor drive system based on magnetic saliency," *Industry Applications, IEEE Transactions on*, vol. 34, pp. 806-812, 1998 also hereby incorporated by reference.

In a SPMSM design, small amounts of exposed steel in between the magnets may saturate at particular rotor positions. Again, a high frequency injection signal may be used to detect this saturation which will result in a modulation of a measured induction of the stator coils. SPMSM sensorless drive is described in "Jang et al., Sensorless drive of surface-mounted permanent-magnet motor by high-frequency signal injection based on magnetic saliency," *Industry Applications, IEEE Transactions on*, vol. 39, pp. 1031-1039, 2003 also hereby incorporated by reference.

Current position sensorless detection systems are relatively ineffective in SPMSM designs which provide a substantially continuous outer magnetic surface. Many position sensorless systems are susceptible to interference by the drive signal which may obscure sensitive measurements of inductance or reluctance.

SUMMARY OF THE INVENTION

The present invention provides a motor design in which a saliency is implemented through stator design and, in particular, through design of stator teeth to produce measurable saturation as a function of rotor position. In one embodiment, the stator is designed to be saturated by "zigzag" leakage flux conducted between rotor magnetic poles and thus may be out of phase with the drive current of the stator. This phasing permits improved extraction of the sensing spatial signal with reduced interference from the drive signal. Various embodiments of the invention also provide for preferred winding arrangements and numbers of rotor poles and stator slots.

Specifically, the present invention provides a permanent magnet synchronous motor system using a motor having a rotor supported to rotate about an axis and holding at least one permanent magnet providing multiple angularly spaced magnetic poles, and having a stator fitting about the rotor so that the rotor may rotate within and with respect to the stator. The stator provides a plurality of angularly spaced teeth extending inward toward the rotor and electrically conductive coils coiling around at least some of the teeth to apply a magnetic field thereto. A position detection unit provides an injection signal generator applying an electrical signal to the coils at a frequency substantially higher than a drive frequency applied to the coils, the latter to cause rotation of the rotor. An injection signal analyzer analyzes the injection signal to detect variations in the injection signal functionally related to the rotor position and caused by magnetic saturation of the teeth by the permanent magnets of the rotor to deduce rotor position.

It is thus a feature of a least one embodiment of the invention to permit position sensorless operation for motor types having zero or very low saliency in the rotor. By introducing the saliency in the stator, SPMSM sensorless drives may be used effectively.

The permanent magnet may be positioned on an outer surface of the rotor.

It is thus a feature of a least one embodiment of the invention to provide a position sensorless system suitable for surface permanent magnet synchronous motors that are not readily adaptable to systems that measure variation in reluctance between coils.

The outer surface of the rotor may provide a substantially angularly unbroken permanent magnet material.

It is thus a feature of a least one embodiment of the invention to provide a position sensorless system suitable for rotors having a uniform outer surface tending to have zero or very low saliencies.

The teeth of the stator may provide circumferentially extending bridges having a predetermined thickness selected so that the rotor causes magnetic saturation in the bridges at periodic rotor positions.

It is thus a feature of a least one embodiment of the invention to provide a system adaptable to a wide range of stator designs.

The stator may be formed to produce a maximum saturation under the influence of rotor zigzag leakage flux between rotor magnetic poles in a SPMSM.

It is thus a feature of a least one embodiment of the invention to provide a saturation effect that is largely indifferent to the distal structure of the stator and its coil but instead determined primarily by the stator tip. It is another feature of a least one embodiment of the invention to provide for a saturation that affects the spatial saliency of the motor to be more robust against load changes and drive induced effects that more strongly affect the quadrature phase inductance $L_q$.

The number of teeth may differ by less than three from two times a number of pole pairs.

It is thus a feature of a least one embodiment of the invention to provide a motor harmonic structure that improves the ability to detect the stator-based saliency of the present invention.

Every tooth of the stator may be surrounded by a coil.

It is thus a feature of a least one embodiment of the invention to adopt a double-layer winding that accentuates the stator-based saliency being detected.

The permanent magnet synchronous motor system may further include a drive circuit for applying electrical power to the coils as a function of the deduced rotor position.

It is thus a feature of a least one embodiment of the invention to provide a position sensorless drive system for a permanent magnet synchronous motor.

The drive circuit may further apply electrical power to the coil as a function of detected back-EMF in the coil.

It is thus a feature of a least one embodiment of the invention to provide a drive that may use stator-based saliency for low-speed operation and conventional back-EMF (electromotive force) detection for high-speed operation.

These particular features and advantages may apply to only some embodiments falling within the claims, and thus do not define the scope of the invention.

DETAILED DESCRIPTION OF THE PREFERRED EMBODIMENT

Figure 1:
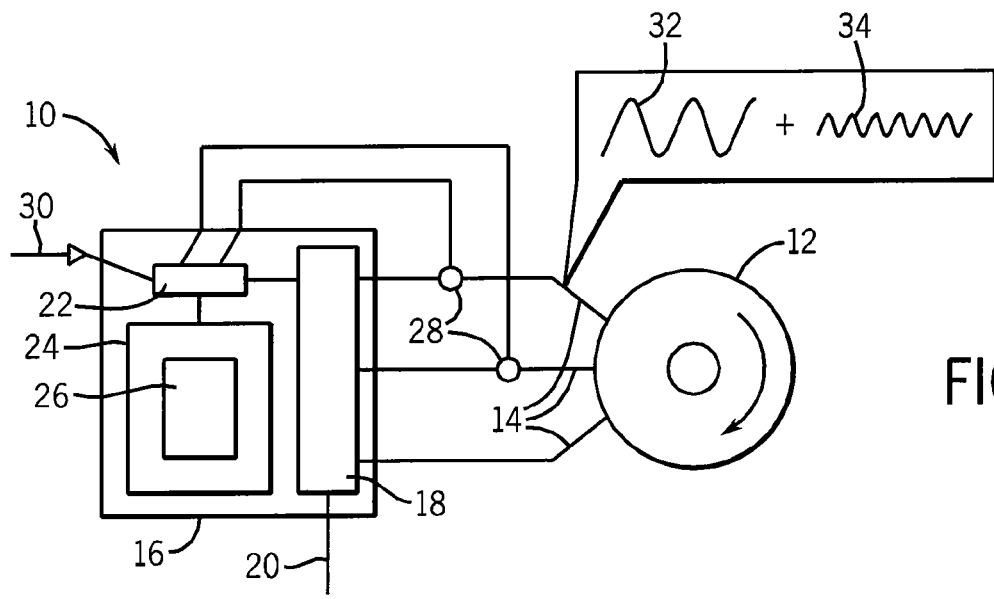
FIG. 1 is a simplified block diagram of the motor system of the present invention providing a motor and control electronics.

Referring now to FIG. 1, a position sensorless permanent magnet synchronous motor system 10 may include a permanent magnet motor 12 receiving electrical drive power over leads 14 from a drive system 16.

The hardware of the drive system 16 may be of conventional design providing drive electronics 18 receiving electrical power 20 and synthesizing, for example using pulse width modulation, arbitrary waveforms on leads 14. The drive electronics 18 may be controlled by a microprocessor 22 or the like communicating with a memory 24 holding a stored program 26 providing for standard control algorithms together with the rotor position-sensing system of the present invention, as will be described in more detail below. The microprocessor 22 may monitor the current through the leads 14 using current sensors 28 and the voltage on the leads 14 via signals provided by the drive electronics 18 for the rotor position-sensing system of the present invention as well as the standard control of the motor 12. As will be understood in the art, the microprocessor 22 further may receive a command signal 30, for example, torque, current, velocity or the like, for the control of the motor 12.

As will be described in more detail below, the program 26, when executed, will control the drive electronics 18 to provide over each drive line 14, both drive power 32 providing a fundamental component energizing the motor 12 and an injection signal 34 used for position sensing per the present invention. Generally the injection signal 34 will be of lower amplitude and higher frequency than the drive power 32 and in one embodiment of the present invention will be on the order of one kilohertz.

Figure 2:
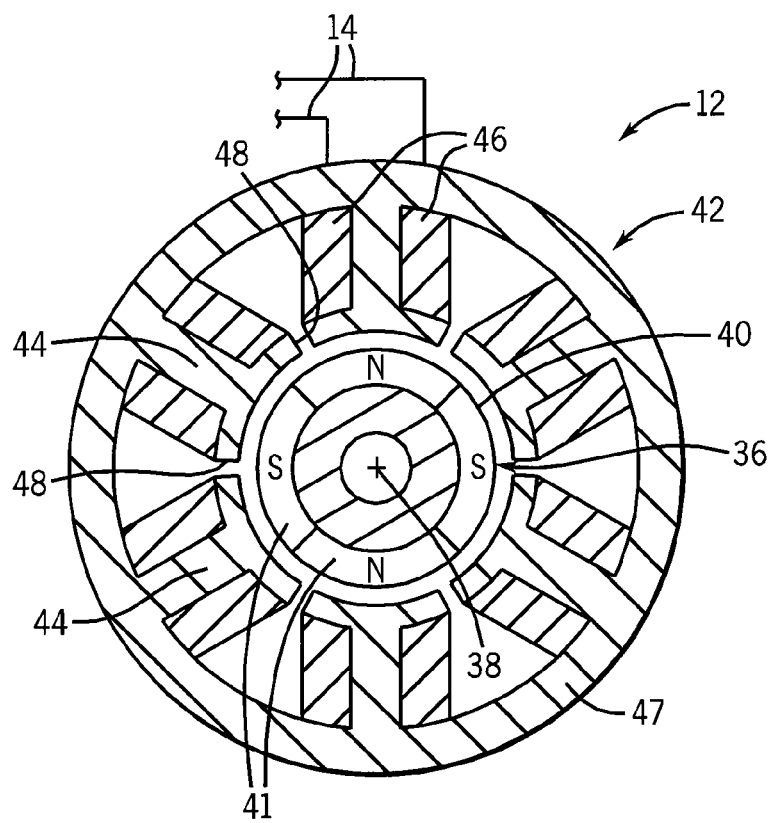
FIG. 2 is a cross-sectional view through a simplified motor per the present invention showing stator teeth approaching a central rotor, the latter having surface-mounted magnets.

Referring now to FIG. 2, motor 12 may be a surface mount permanent magnet synchronous motor having a central rotor 36 supported on bearings to rotate about a rotational axis 38. In one embodiment of the invention, the rotor 36 has on its outer surface a continuous cylindrical magnetic ring 40 magnetized to provide multiple magnetic poles 41 of alternating polarity. Optionally, multiple magnets, each forming a single pole, may be mounted around the periphery of the rotor 36 with alternating polarities. The poles 41 are separated at regular intervals, angularly, about the axis 38. In the simplified example of FIG. 2, four poles are shown of alternating north and south polarity. Because the surface of the rotor 36 is continuous and of a uniform material, saliency in the rotor 36 is low.

The rotor 36 fits within a stator 42 being formed, for example, of a set of ferromagnetic laminations providing a set of radially oriented teeth 44 extending inward from outer stator ring 47 to angularly spaced points proximate to the outer surface of the rotor 36. In a preferred embodiment, each tooth 44 is surrounded with a multi-turn electrical coil 46, for example, of copper wire whose ends provide leads 14 to receive the drive power 32 and the injection signal 34. This configuration is termed "double-layer" winding and differs from a single layer winding in which only every other tooth has a coil 46 whose windings fully fill the gaps between the teeth 44. Generally the leads 14 from the coils 46 will be combined in commonly driven phases of signals produced by the drive electronics 18.

The end of each tooth 44 proximate to the rotor 36 may have tips 48 extending circumferentially on either side of the tip of the tooth 44 by equal distances. The bridges 48 may also curve to follow the surface of the rotor 36. These bridges 48 may exist in a conventional design to retain the coils 46, but in the present invention are enlisted to provide for saliency as will be described below.

Figure 3A:
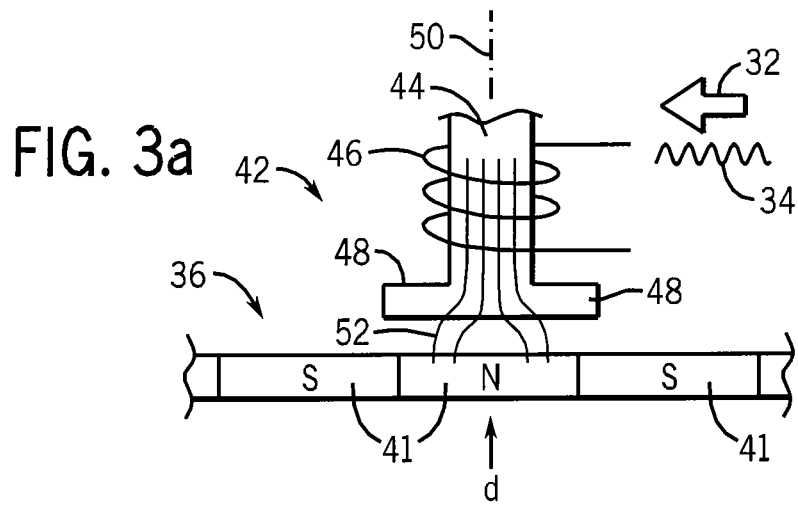
FIG. 3a is a simplified representation of the motor of FIG. 2 "unrolled" for clarity and showing a given stator tooth during the direct phase, when relatively large drive power is applied to the stator tooth, showing a simplified flux conduction path for drive flux concentrated along a central axis of the tooth.

Referring now to FIG. 3a, when a given stator tooth 44 is aligned with the rotor in the direct phase (meaning that a pole 41 of the rotor 36 is substantially centered along a radial central axis 50 of the stator tooth 44) the coil 46 will receive drive power 32 with a superimposed injection signal 34, where the drive power 32 has a polarity such as to promote an attraction with the aligned pole 41 of the rotor 36. The action of the coil 46 receiving drive power 32 is such as to draw flux lines 52 from the pole 41 substantially along the central axis 50 of the stator tooth 44 and thus somewhat removed from the bridges 48. It will be noted generally that this concentration will be enhanced by a magnetic pole 41 that has smaller angular extent than the width of the bridges 48 leading to a general design principle as will be discussed below.

Figure 3B:
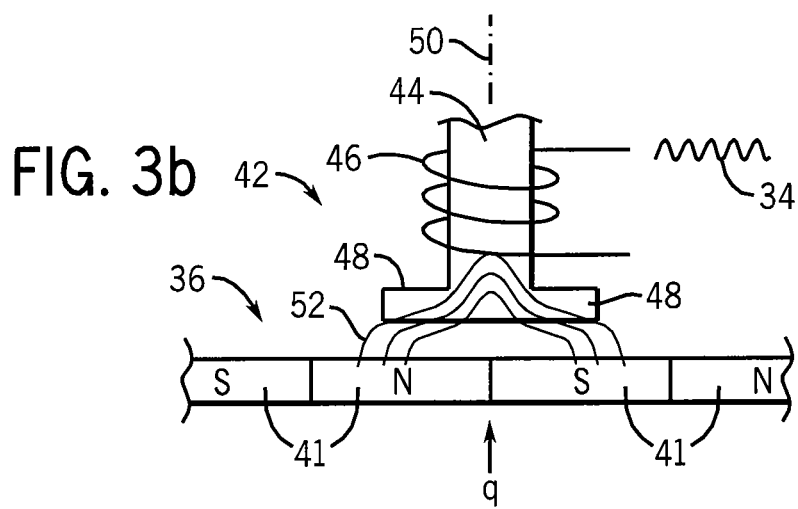
FIG. 3b is a figure similar to that of FIG. 3a showing the given stator tooth during the quadrature phase, when relatively low drive power is applied to the stator tooth, showing a simplified flux conduction path for "zigzag" leakage flux directed through the bridges on either side of the stator tooth.

Referring to FIG. 3b, in contrast, when the stator tooth 44 is aligned with the rotor 36 in the quadrature phase with a central axis 50 substantially between centers of two poles 41 of the rotor 36, the coil 46 will be receiving substantially only the injection signal 34 and thus will not contribute significantly to the flux path through the tip of the stator tooth 44. At this time, a rotor zigzag leakage flux represented by flux lines 52 passes laterally through the stator tooth 44 along the bridges 48 between the poles 41 flanking the central axis 50. This flux path provides substantially greater flux through the bridges 48 increasing the saturation of the material of the bridges 48.

Figure 4:
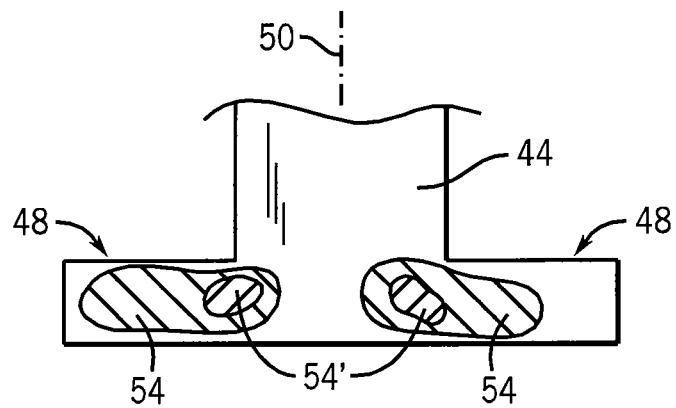
FIG. 4 is a detailed fragmentary view of the tip of the stator tooth showing different areas of saturation in the quadrature and direct phases.

Referring to FIG. 4, the different flux patterns described above will result in two differing saturation modes of the stator tooth 44 providing a substantially greater saturation region 54 during the quadrature phase, the saturation region extending substantially into the bridges 48, and a substantially lesser saturation region 54' occurring during the direct phase because of the substantially lower flux density in the material of the bridges 48 during that time. The thinness of the bridges 48 promotes a high flux density promoting saturation as will be described below.

Figure 5:
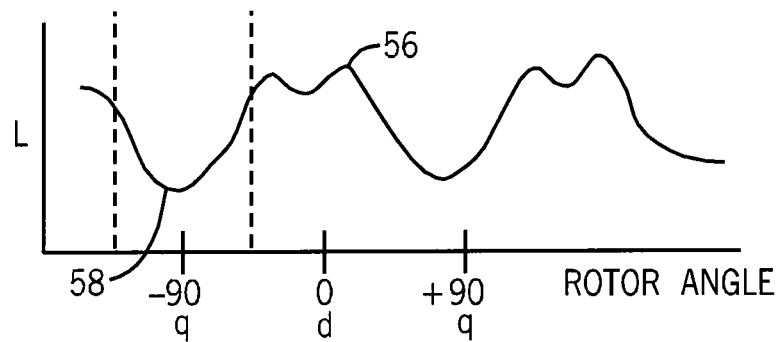
FIG. 5 is a simplified representation of measured inductance in a particular stator coil associated with a given stator tooth at various angular positions of the rotor.

Referring now to FIG. 5, the saturation of the material of the stator tooth 44 will reduce the effective inductance of the coil 46 as may be measured by the injection signal 34 (as affecting the impedance experienced by that signal) per conventional techniques. This measurement may be synchronized with the phase of the rotor 36 (and the drive power 32) so as to distinguish between inductance during the quadrature phase $L_q$ and inductance during the direct phase $L_d$ to better isolate the measured saliency using understood phase decomposition techniques. For a given stator tooth 44, the inductance function 56 (L) of that tooth 44 will have a minimum 58 occurring at quadrature phases of the rotor 36. This minimum 58 and the shape of the curve about the minimum 58 may be used to accurately determine the position of the rotor 36 with respect to the stator 42 within the range of stator tooth angular periodicity.

This position information may be used to synchronize the drive power 32 with rotor position for conventional motor operation.

Because the measured inductance is based on the injection signal excitation and is not principally a function of rotor speed, this sensing technique is well suited to low rotor speeds.

Figure 6:
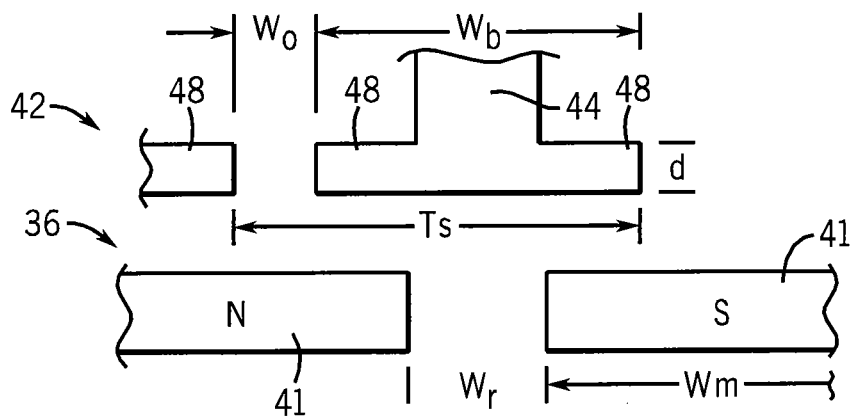
FIG. 6 is a fragmentary schematic representation of the stator tooth and rotor magnets showing particular dimensions that may be optimized to promote saliency.

Referring now to FIG. 6, the degree of the saliency provided by the saturation of the rotor tip may be enhanced by adjusting the dimensions of various components of the motor 12 according to some general design rules. A first rule is that the separation between the poles of the magnets on the rotor should be small compared to the spacing between the stator teeth. That is:

$$w_r \leq \frac{w_o + w_b}{2} \qquad (1)$$

where $w_r$ is the circumferential separation between magnetic poles on the rotor;

$w_o$ is a circumferential separation between adjacent ends of bridges on adjacent stator teeth; and $w_b$ is the circumferential width of the stator tooth from one bridge to the other.

This rule generally expresses the fact that the stator tooth should form a conduit for the rotor zigzag leakage flux between adjacent poles.

A second design rule is that the bridge height should generally be relatively thin as expressed by the following equation:

$$d \leq 0.66 \frac{(w_b + w_o - w_r)^2}{4(w_b + w_o)} - 1 = 0.66 \frac{(\tau_s - w_r)^2}{4\tau_s} - 1 \qquad (2)$$

where $\tau_s$ is the circumferential width of the stator slot width
d is the radial height of the bridge.

Generally it will be noted that the rotor zigzag leakage flux has greater saturation in the bridges 48 (shown with respect to FIG. 4) by decreasing the slot pitch TS.

Desirably, too, the stator teeth 44 will be designed to reduce the harmonic content of the inductance function 56 (shown with respect to FIG. 5) as may be fine-tuned by modeling or the like.

The present inventors have also determined that particular combinations of numbers of the poles and stator teeth (slots) provide improved saliency detectability for stator-based saliency and, in particular, that those combinations described by the following formulas are preferred:

$$N_s = 2p \pm 2 \qquad (3)$$

$$N_s = 2p \pm 1 \qquad (4)$$

where $N_s$ is the number of slots; and
p is the number of magnetic pole pairs respectively.

Figure 7:
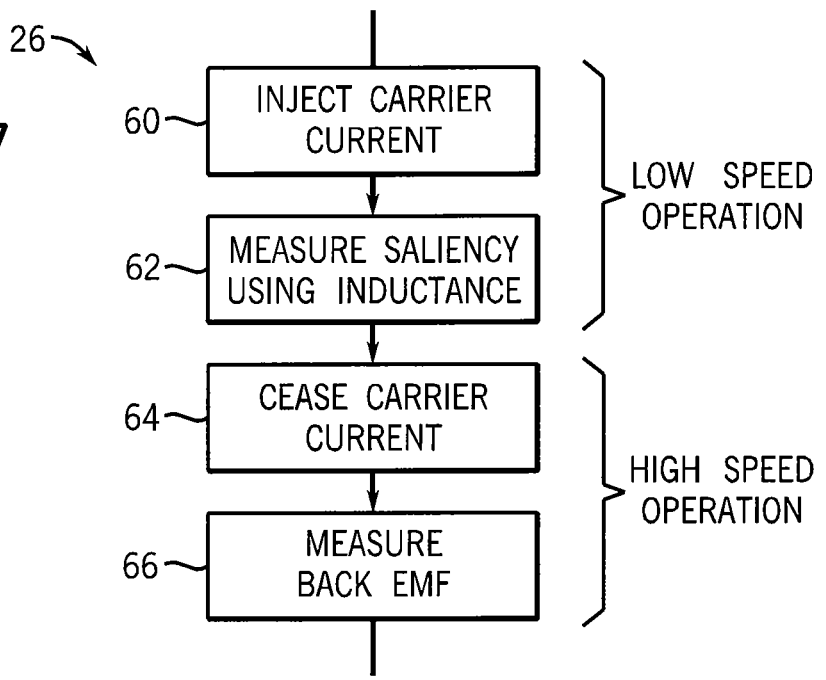
FIG. 7 is a flow chart of the principal operations executed by the program of FIG. 1 in low-speed and high-speed operation.

Referring now to FIG. 7, the present invention contemplates that the sensed position may be used for control of the drive electronics 18 in two distinct operating modes. During low-speed operation, under the control of the program 26 as indicated by process block 60, the drive electronics 18 will be controlled to inject the injection signal 34. At process block 62, the injection signal 34 may be used to detect the saliency using the inductance measuring techniques described above.

Because the measured inductance is largely indifferent to rotor speed, this technique is particularly suited for low-speed operation.

During high-speed operation, as indicated by process block 64, the injection signal 34 may be halted, and a conventional back-EMF detection process may be used, per process block 66, measuring the voltage reflected back into the coils 46 by passage of the magnetic poles 41 for position detection. Sensorless operation based on back-EMF methods are reported in U.S. Patent Publication Nos. US 2005/ 6924617 B2, US 2006/7026772 B2, US 2007/7245104 B2 and US 2003/6552509 B2 also hereby incorporated by reference. In both cases the detected position may be used to synchronize the drive power 32 appropriately as is understood in the art.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. In the present invention processors should be considered to embrace any functionally capable circuitry including, for example, field programmable gate arrays and the like It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A permanent magnet motor system comprising:
a rotor supported to rotate about an axis and holding at least one permanent magnet providing multiple angularly spaced magnetic poles;
a stator fitting about the rotor so that the rotor may rotate within and with respect to the stator, the stator providing a plurality of angularly spaced teeth extending inward toward the rotor;
electrically conductive coils coiling around at least some of the teeth to apply a magnetic field thereto;
an injection signal generator applying an electrical signal to the at least one coil at a frequency substantially higher than a drive frequency applied to the coils, the latter to cause rotation of the rotor; and
an injection signal analyzer analyzing the injection signal to detect variations in the inductance of the at least one coil functionally related to the rotor position to deduce rotor position;
wherein the angularly spaced teeth are shaped so that the inductance at a q-phase of the rotor is lower than the inductance at a d-phase of the rotor.

2. The permanent magnet motor system of claim 1 wherein the permanent magnet is positioned on an outer surface of the rotor.

3. The permanent magnet motor system of claim 1 wherein an outer surface of the rotor provides a substantially angularly continuous permanent magnet material.

4. The permanent magnet motor system of claim 1 wherein the teeth provide circumferentially extending bridges having a predetermined thickness selected so that the rotor causes maximum magnetic saturation in the bridges at periodic rotor positions when a centerline of the tooth is substantially midway between centerlines of the magnetic poles.

5. The permanent magnet motor system of claim 1 wherein the stator is formed to produce a maximum saturation under an influence of rotor zigzag leakage flux between motor magnetic poles.

6. The permanent magnet motor system of claim 1 wherein a number of teeth differ by less than three from two times a number of magnetic pole pairs.

7. The permanent magnet motor system of claim 1 wherein every tooth is surrounded by a coil.

8. The permanent magnet motor system of claim 1 further including a drive circuit for applying electrical power to the coils as a function of the deduced rotor position.

9. The permanent magnet motor system of claim 1 wherein the drive circuit further applies electrical power to the coil as a function of detected back-EMF in the coil.

10. The permanent magnet motor system of claim 1 wherein the teeth have circumferentially extending bridges where a circumferential width of the stator tooth wb from one bridge to the other is such as to substantially span a width wm of a given magnetic pole when the tooth is aligned with the given magnetic pole.

11. A permanent magnet motor system comprising:
a rotor supported to rotate about an axis and holding at least one permanent magnet providing multiple angularly spaced magnetic poles;
a stator fitting about the rotor so that the rotor may rotate within and with respect to the stator, the stator providing a plurality of angularly spaced teeth extending inward toward the rotor,
electrically conductive coils coiling around at least some of the teeth to apply a magnetic field thereto;

an injection signal generator applying an electrical signal to at least one coil at a frequency substantially higher than a drive frequency applied to the coils, the latter to cause rotation of the rotor; and an injection signal analyzer analyzing the injection signal to detect variations in inductance of at least one tooth by the permanent magnets of the rotor functionally related to the rotor position to deduce rotor position wherein the dimensions of the motor are selected according to a rule selected from the group consisting of:

$wr \leq wo+wb2$ where wr is a circumferential separation between magnetic poles on the rotor;

wo is a circumferential separation between adjacent ends of bridges on adjacent stator teeth; and wb is the circumferential width of the stator tooth from one bridge to the other; and $d<0.66(\tau s-wr)24\tau s-1$ where τs is the circumferential width of the stator slot width d is the radial height of the bridge.

12. A method of operating a permanent magnet motor of a type providing a permanent magnet motor system having:

a rotor supported to rotate about an axis and holding at least one permanent magnet providing multiple angularly spaced magnetic poles;

a stator fitting about the rotor so that the rotor may rotate within and with respect to the stator, the stator providing a plurality of angularly spaced teeth extending inward toward the rotor, electrically conductive coils coiling around multiple teeth to apply a magnetic field thereto to drive the rotor;

an injection signal generator applying an electrical signal to the sensor coil at a frequency substantially higher than a drive frequency applied to the coils, the latter to cause rotation of the rotor; and an injection signal analyzer analyzing the injection signal to detect variations in inductance of at least one tooth caused by the permanent magnets of the rotor and functionally related to the rotor position to deduce rotor position; the method comprising the steps of:

(a) applying an injection signal to at least one coil of the motor stator;

(b) measuring inductance of the at least one coil over time using the injection signal;

(c) deducing that rotor position is at the q-phase from a decrease in measured inductance; and (d) using the deduced rotor position to control a drive current signal applied to coils of the motor stator to provide rotation of the rotor.

13. The method of claim 12 wherein the rotor provides at least a permanent magnet positioned on an outer surface of the rotor presenting a substantially angularly unbroken permanent magnet material.

14. The method of claim 12 wherein the teeth have circumferentially extending bridges having a thickness selected causing magnetic saturation in the bridges at periodic rotor positions from rotor zigzag leakage flux.

* * * * *

UNITED STATES PATENT AND TRADEMARK OFFICE
CERTIFICATE OF CORRECTION

PATENT NO. : 8,531,143 B2
APPLICATION NO. : 12/879350
DATED : September 10, 2013
INVENTOR(S) : Yang et al.

It is certified that error appears in the above-identified patent and that said Letters Patent is hereby corrected as shown below:

IN THE CLAIM

Column 9, line 18, Claim 11

Delete - "$d < 0.66(\tau s-wr)24\tau s- 1$" and replace with -- $d \leq 0.66(\tau s-wr)24\tau s- 1$ --

Signed and Sealed this
Nineteenth Day of November, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,531,143 B2 | Page 1 of 1 |
| APPLICATION NO. | : 12/879350 | |
| DATED | : September 10, 2013 | |
| INVENTOR(S) | : Shih-Chin Yang et al. | |

It is certified that error appears in the above-identified patent and that said Letters Patent is hereby corrected as shown below:

Title Page, Item (75)

Inventor name spelled incorrectly;

Delete – "Takhiro Suzuki" and replace with -- Takahiro Suzuki --

Signed and Sealed this
Fourteenth Day of October, 2014

Michelle K. Lee
*Deputy Director of the United States Patent and Trademark Office*